(12) United States Patent
Prange

(10) Patent No.: US 6,323,913 B1
(45) Date of Patent: Nov. 27, 2001

(54) CIRCUIT CONFIGURATION FOR COLOR DECODING AND DECIMATION FOR A VIDEO SIGNAL

(75) Inventor: Stefan Prange, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/114,734

(22) Filed: Jul. 13, 1998

Related U.S. Application Data

(63) Continuation of application No. PCT/DE97/00034, filed on Jan. 10, 1997.

(51) Int. Cl.[7] ............................. H04N 5/45; H04N 5/445; H04N 9/66; H04N 9/67
(52) U.S. Cl. .......................... 348/566; 348/565; 348/638; 348/659
(58) Field of Search ..................... 348/565, 566, 348/638, 639, 659, 661, 651, 653, 654, 624, 630; H04N 5/44, 5/445, 9/66, 9/67

(56) References Cited

U.S. PATENT DOCUMENTS

| | | | |
|---|---|---|---|
| 4,942,457 | * | 7/1990 | Keesen et al. .................. 358/12 |
| 5,440,349 | * | 8/1995 | Ban ................................. 348/638 |

FOREIGN PATENT DOCUMENTS 42 31 308 C1    1/1994 (DE).

OTHER PUBLICATIONS

"Digital TV-color decoder with line frequency coupling" (Nillesen), Fernsehund Kinotechnik No. 4, 1986, pp. 141–146; (No translation).

"Pix–in–Pix IC with digital decoding/encoding using only one clock" (Rumreich), IEEE, International Conference on Consumer Electronics 1991, pp. 64–65.

"P.I.P assembly, application of digital ITT circuits 2000", Electronique Radio Plans, No. 535, Jun. 1992, pp. 81–90; (No translation).

"Ics for entertainment electronics; picture–in–picture system" No. 5, 1991.

* cited by examiner

Primary Examiner—Reinhard J. Eisenzopf
Assistant Examiner—Brian P. Yenke
(74) Attorney, Agent, or Firm—Herbert L. Lerner; Laurence A. Greenberg; Werner H. Stemer

(57) ABSTRACT

The circuit configuration provides for the combined color decoding and decimation of a video signal, particularly for picture-in-picture insertion in television sets. The color subcarrier is determined from a video signal for the purpose of recovering the chrominance signal components. The video signal is multiplicatively combined with orthogonal color subcarrier components and then filtered through low-pass filters. For the luminance signal components, the video signal is filtered by a further low-pass filter. In order to obtain decimated luminance and chrominance signal components, subsampling is carried out after the low-pass filters. Given suitable dimensioning of the low-pass filters matched to the decimation factor, a single low-pass filter in each of the chrominance signal paths is sufficient and, in the luminance signal path, an otherwise necessary notch filter is obviated.

13 Claims, 3 Drawing Sheets

CIRCUIT CONFIGURATION FOR COLOR DECODING AND DECIMATION FOR A VIDEO SIGNAL

CROSS-REFERENCE TO RELATED APPLICATION

This is a continuation of copending International Application PCT/DE97/00034, filed Jan. 10, 1997, which designated the United States.

BACKGROUND OF THE INVENTION

1. Field of the Invention

The invention relates to a circuit configuration for color decoding and decimation for a video signal. Such a circuit configuration is particularly suitable for inserting a reduced picture into a main picture or parent picture, i.e. so-called picture-in-picture insertion.

Picture-in-picture insertion requires that the picture to be inserted is reduced from its original, input size to the picture size to be inserted. In other words, the picture signal is to be decimated. Moreover, in the course of the picture processing, it is expedient for the brightness and color signal components to be processed separately. These signal components are combined in the video signal at the receiving end. The luminance and two chrominance signal components are obtained from the video signal, i.e. the color decoding, is carried out prior to the decimation.

A prior art circuit configuration for picture-in-picture insertion is described in the SIEMENS product description "ICs for Entertainment Electronics; Picture-in-Picture System," Issue May 1991, in particular page 8 and pages 42–43. A digitally operating color decoder generates a digital luminance signal Y and two digital chrominance signals U, V which are fed to a picture-in-picture processor. The latter contains, on the input side, a decimator which decimates the picture to be inserted with regard to its size. The decimated picture is then buffer-stored in a frame memory. A commercially available module which is not necessarily adapted to the specific application of picture-in-picture insertion is proposed as color decoder. Therefore, the signal components Y, U, V with the largest possible signal bandwidth in each case are fed to the input side of the decimation device. For the purpose of decimation, horizontal and vertical averaging of pixels is carried out for each signal component. For picture-size reduction by the factor 1/9, 9 pixels are averaged to form a single pixel for the picture to be inserted.

As a result of the decimation by means of averaging, the sampling rate of the picture to be inserted is reduced. In order to satisfy the sampling/Nyquist theorem after decimation as well, thereby preventing interfering effects in the decimated picture, corresponding band limiting of the signal components to be decimated is necessary. For this purpose, the averaging operation does actually include low-pass filtering, but the passband thereof is indeterminately delimited such that the decimated picture nevertheless contains interfering effects.

An example of a conventional digital color decoder is described in Fernseh- und Kino-Technik, Ton Nillesen: "Digitaler TV-Farbdecoder mit Zeilenfrequenzverkopplung" [Digital TV Color Decoder With Line Frequency Locking], No. 4/1986, pages 141 to 146. In order to keep the bandwidth of the color-decoded output signals Y, U, V as large as possible, the color decoder has high-quality filters on the output side, namely a respective low-pass filter in the path of the chrominance signals, which filter out the respective mixed products at multiples of the carrier frequency, and a notch filter in the path of the luminance signal component, which filters out the color subcarrier. The entire picture-in-picture system thus has a relatively high outlay on circuitry. A fully integrated implementation of a color decoder and picture-in-picture processor on a single integrated circuit chip would be correspondingly complex.

SUMMARY OF THE INVENTION

It is accordingly an object of the invention to provide a circuit configuration for color decoding and decimation for a video signal, which overcomes the above-mentioned disadvantages of the prior art devices and methods of this general type and which has as few functional blocks as possible and, consequently, a low outlay on circuitry.

With the foregoing and other objects in view there is provided, in accordance with the invention, a circuit configuration for color coding and decimation for a video signal having a color component, comprising:

an analog-to-digital converter receiving a video signal with a color component, the analog-to-digital converter generating a digitized video signal and having an output; a recovery device connected to the analog-to-digital converter for recovering from the video signal a carrier coupled to a color subcarrier frequency;

a multiplier connected to the recovery device for multiplicatively combining the carrier recovered in the recovery device with a digitized video signal generated by the analog-to-digital converter, and for thereby generating a first signal component and a second signal component;

a first low-pass filter having an input connected directly to the output of the analog-to-digital converter, the first low-pass filter having a passband below the color component in a frequency spectrum of the video signal, filtering the digitized video signal, and generating a luminance signal component;

a second low-pass filter having an input connected directly to the multiplier, the second low-pass filtering the first signal component and generating therefrom a first chrominance signal component;

a third low-pass filter having an input connected directly to the multiplier, the third low-pass filter filtering the second signal component and generating therefrom a second chrominance signal component;

wherein the luminance signal component and the first and second chrominance signal components output by the first, second and third low-pass filters, respectively, have sampling rates which are reduced relative to sampling rates of their respective input signals, as defined by a degree of decimation.

In accordance with an added feature of the invention, a sampling of the video signal in the analog-to-digital converter is coupled to the color subcarrier frequency, and wherein the multiplier includes a first device enabling a sign of the digitized video signal to be altered in a manner coupled to the color subcarrier frequency, and a changeover device enabling an output signal of the first device to be passed to the second or third low-pass filter means with coupling to the color subcarrier frequency.

In accordance with an additional feature of the invention, the first device is controlled by a signal at twice the color subcarrier frequency and the changeover device is controlled by a signal at four times the color subcarrier frequency.

In accordance with another feature of the invention, the video signal contains a luminance spectral component and a chrominance spectral component modulated on a color subcarrier, and wherein the first low-pass filter has a spectral passband below the chrominance spectral components, and a spectral stop band.

In accordance with a further feature of the invention, the video signal contains a picture with a given size which is decimated by a factor $N^2$, and wherein the sampling rate of an output signal of the first low-pass filter amounts to a factor $1/N^2$ of a sampling rate of an input signal of the first low-pass filter.

In accordance with again an added feature of the invention, the sampling rates for the chrominance signal components amount to a factor $1/M$ times a sampling rate for the luminance signal component, and wherein respective passbands of the second and third low-pass filters substantially amount to a factor $1/M$ times the passband of the first low-pass filter means.

In accordance with again an additional feature of the invention, the first, second, and third low-pass filters each comprise horizontally acting low-pass filters.

With the above and other objects in view there is provided, in accordance with the invention, a television set which comprises the above-described circuit configuration, a screen displaying a main picture generated by a further video signal, and a second picture, decimated by the circuit configuration and inserted into the main picture.

According to the invention, the filters required for color decoding and the filters required for decimation are combined. A notch filter in the luminance path is no longer necessary since, in the course of decimation, the low-pass filter required for band limiting in the luminance path carries out bandwidth limitation to a point below the color subcarrier in any case. Furthermore, in the color decoder there is no longer a need for separate low-pass filters for suppressing the modulation products at multiples of the carrier frequency. The corresponding low-pass filtering is effected by the low-pass filters which are provided for decimation in any case. In an expedient manner, the low-pass filter in the luminance path suppresses at least the chrominance components contained there.

Since the human eye is substantially less sensitive to color than to brightness, the color signal components usually have a lower sampling rate. Therefore, the low-pass filters in the chrominance signal paths have correspondingly smaller passbands. Given a display format of Y:U:V of 4:1:1 for the subsequent buffer-storage, it suffices for the passbands of the low-pass filters in the chrominance paths to have only a quarter of the passband of the low-pass filter in the luminance path. If the picture to be inserted is to be decimated to $1/N^2$ of its original picture size, this requires the sampling rate in the luminance path to be reduced to $1/N^2$ of the original sampling rate and the sampling rate in the chrominance signal paths in each case to $1/4N^2$ of the original sampling rate. The low-pass filters, acting as horizontal low-pass filters, are designed for horizontal decimation in such a way that either only $1/N$ of the samples on the output side is calculated or only every $N^{th}$ value of the low-pass-filtered samples is fed to further processing. For vertical decimation, only every $N^{th}$ line is subject to further processing.

In accordance with again another feature of the invention, vertically acting low-pass filters are connected downstream (output side) of each of the first, second, and third low-pass filters. In a preferred embodiment, the vertically acting low-pass filters have a comb filter characteristic.

Comb filters improve the separation of chrominance and luminance signal components in the picture to be inserted and reduce crosstalk. Comb filters are particularly advantageous in the chrominance signal paths, where they are arranged on the output side after the subsampling of the horizontal low-pass filters. In addition, it is possible to arrange a comb filter in the luminance path on the output side in order to suppress high-frequency chrominance components in the luminance. As is known, comb filters are vertically acting low-pass filters whose delay elements, in the case of a digital implementation, delay in each case by the duration of a picture line. For vertical decimation by $1/N$, it is expedient for only every $N^{th}$ line to be calculated by the comb filters.

The color subcarrier recovery can advantageously be carried out with frequency-coupling to the color subcarrier. Sampling in the A/D converter in this case takes place at four times the color subcarrier frequency. The samples for the color subcarrier then logically come to be +1, 0, −1 (normalized to the color subcarrier amplitude). The mixing of the color signal components in the combined video signal into the baseband, which is usually carried out by a multiplier to which the video signal and the color subcarriers are fed phase-shifted by 90°, is simplified correspondingly. It then contains a sign change device which is clocked at twice the color subcarrier frequency and a changeover switch between the first and the second color signal path which is clocked at four times the color subcarrier frequency.

As a result of the simplifications and savings brought about in the circuit configuration according to the invention in the context of combined color decoding and decimation—in comparison with a conventional solution using separate stand-alone components—integration of the color decoder and the picture-in-picture processor on a single integrated circuit chip is easily possible in respect of the area that is taken up by the system.

Other features which are considered as characteristic for the invention are set forth in the appended claims.

Although the invention is illustrated and described herein as embodied in a circuit configuration for color decoding and decimation for a video signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
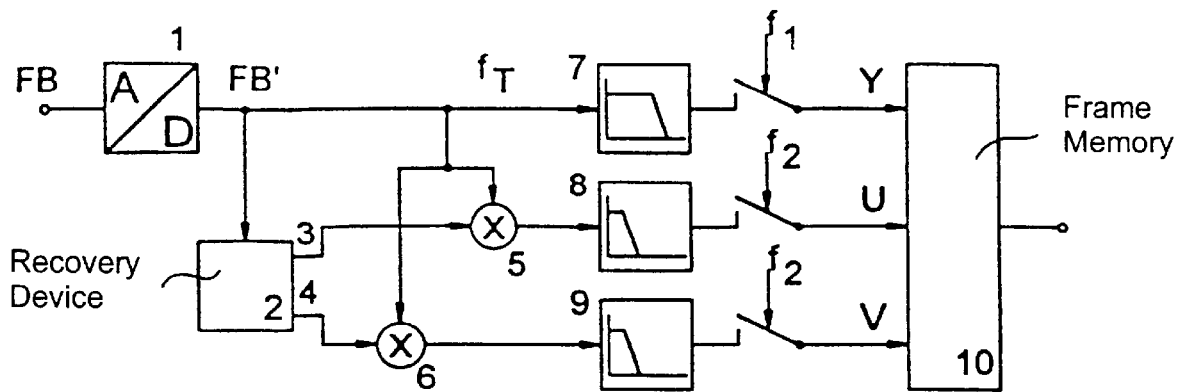
FIG. 1 is a block circuit diagram of a novel circuit configuration for the color decoding and decimation of a video signal.
Figure 3:
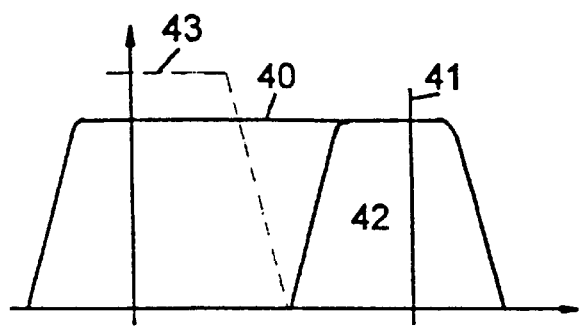
FIG. 3 is a frequency spectrum of a video signal including a frequency characteristic for the low-pass filter in the luminance channel.

Referring now to the figures of the drawing in detail and first, particularly, to FIG. 1 thereof, there is seen a novel circuit configuration wherein a video signal FB is fed to an analog-to-digital converter 1. The frequency characteristic is illustrated in FIG. 3. The signal FB contains a luminance signal component 40, as well as a chrominance signal component 42 arranged asymmetrically about the color subcarrier 41. A digitized video signal FB' is present after A/D conversion. The color subcarrier is recovered from the digitized video signal FB' in a device 2 and made available at the terminals 3, 4 phase-shifted by 90° with respect to one another. As an alternative, the color subcarrier may also be reconstructed from the analog video signal FB with subsequent digitization. The digitized video signal FB' is mixed with the orthogonal color subcarriers in respective multipliers 5, 6. The digitized video signal FB' is fed to a first low-pass filter 7, whose output yields a low-pass-filtered luminance signal. The mixed products output by the multipliers 5, 6 are filtered via a second and third low-pass filter 8 and 9, respectively. The filtered luminance and chrominance signal components Y, U, V are then subsampled. One sample of the chrominance signals U, V is present for every four samples of the luminance signal Y (M=4). For the respective subsampling, $f_1=4 \cdot f_2$ holds true. The subsampling can be effected either by the filters 7, 8, 9 calculating in each case only the samples at the required sampling rate, or by the samples being calculated at the full rate which is also present at the input side of the filters 7, 8, 9, corresponding values then being omitted. The samples of the decimated signals Y, U, V are buffer-stored in a frame memory 10. In a television set with a picture-in-picture insertion function, the signals Y, U, V are read out at the right time for insertion into a main picture supplied by a further video signal and are displayed together with the main picture (the parent picture) on a screen.

For example, the picture to be inserted is decimated to $1/N^2$ of its original size (e.g. N=3). The digitized video signal FB' is sampled at the sampling frequency $f_T$. In order to avoid picture interference on account of the subsampling, the low-pass filter 7 must carry out band limiting to $f_T/2N$ in order to fulfill the sampling theorem. Given a format Y:U:V of 4:1:1, the limiting is carried out by low-pass filters 8, 9 to a frequency that is four times lower, that is to say $f_T/8N$. Further decimation is carried out in the vertical direction by the factor 3 in that only every third line is subjected to further processing.

The maximum possible transmission characteristic for the low-pass filter 7 if picture interference is to be avoided is specified by the curve 43 in FIG. 3. The passband ends where the color component 42 begins in the frequency spectrum of the video signal. The color component is modulated asymmetrically around the color subcarrier 41. If the low-pass filter 7 permits even higher frequencies within the color spectrum 42 to pass, corresponding interference in the decimated picture will have to be reckoned with.

Figure 2:
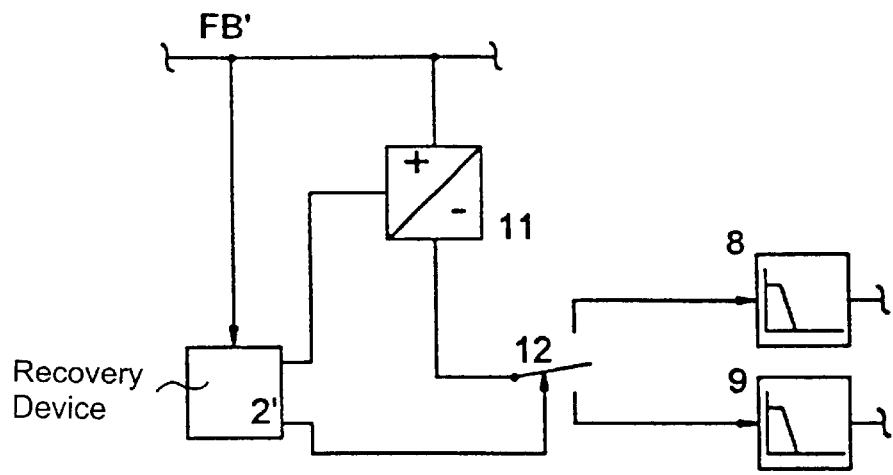
FIG. 2 is a partial block diagram illustrating a simplification of the color subcarrier recovery in the case of carrier-coupled decoding.

The simplification shown in FIG. 2 is possible for an implementation having color subcarrier-coupled sampling at the frequency $f_T$. This simplification contains a sign change device 11, to which the digitized video signal FB' is fed. The device 11 is controlled at twice the color subcarrier frequency, that is to say a sign change is effected at twice the color subcarrier frequency. The signal emitted by the device 11 is fed by means of a changeover switch 12 either to the low-pass filter 8 or to the low-pass filter 9. The changeover device 12 is keyed at four times the color subcarrier frequency. The double and quadruple color subcarrier frequencies are provided by a correspondingly modified color subcarrier recovery device 2'.

Figure 4:
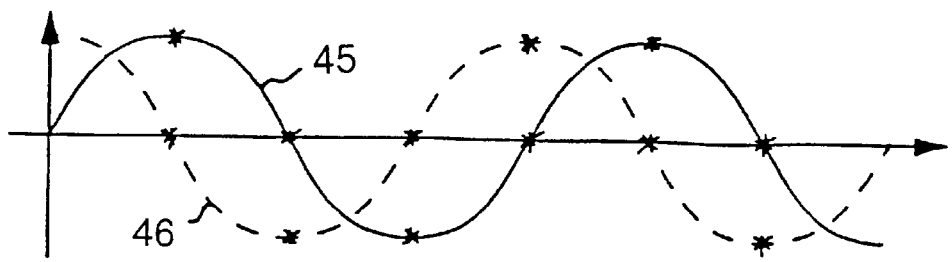
FIG. 4 is a graph of a profile of the color subcarrier in a line of a video signal according to the PAL color standard.

As is shown in FIG. 4 using the profile of the color subcarriers, phase-shifted by 90°, for the color signal components U, V (curves 45 and 46) of a PAL signal, the samples of the two color subcarriers in the case of color subcarrier-coupled A/D conversion are the values +1, 0, −1 (normalized to the color subcarrier amplitude). While one of the carriers has a value other than zero, the other carrier is zero. This allows the changeover between the two chrominance channels by means of the changeover switch 12. The sign change of the respective samples of the carriers is taken into account by the device 11.

Figure 5:
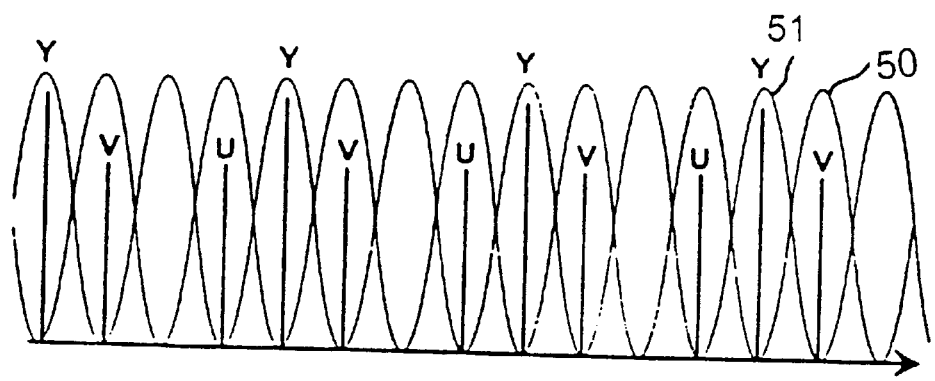
FIG. 5 is a graph of an ideal spectrum of a PAL video signal and comb filter characteristics for luminance and chrominance.

FIG. 5 illustrates a spectrum of a video signal according to the PAL standard along the vertical spatial frequency axis for the ideal case where no vertical frame frequencies are contained, i.e. there is no sudden brightness or color change in the vertical direction. Color and brightness changes in the horizontal direction are not taken into account here. The color definition impression can be enhanced in each case by a so-called comb filter which is connected between the low-pass filter 8 and the output-side subsampling thereof and the memory 10 and, respectively, the low-pass filter 9 and the output-side subsampling thereof and the memory 10 (not illustrated in FIG. 1). The comb filter has the "comb-like" filter characteristic 50 shown in FIG. 5. It ensures attenuation of the luminance signal component Y with regard to vertical frequencies. Comb filters act as vertical low-pass filters and are realized as digital low-pass filters whose delay elements effect a delay by one line. In contrast thereto, the low-pass filters 7, 8, 9 are low-pass filters acting horizontally with regard to the picture direction.

It is expedient for a comb filter also to be arranged in the luminance signal path between the low-pass filter 7 and the output-side subsampling thereof and the input of the memory 10. This comb filter has a frequency response 51, by virtue of which the chrominance signal components U, V remaining in the luminance path are attenuated. The comb filters not only reduce the crosstalk between luminance and chrominance, and vice versa, but also at the same time implement vertical band limiting, thereby avoiding picture interference in the event of vertical decimation.

Figure 6:
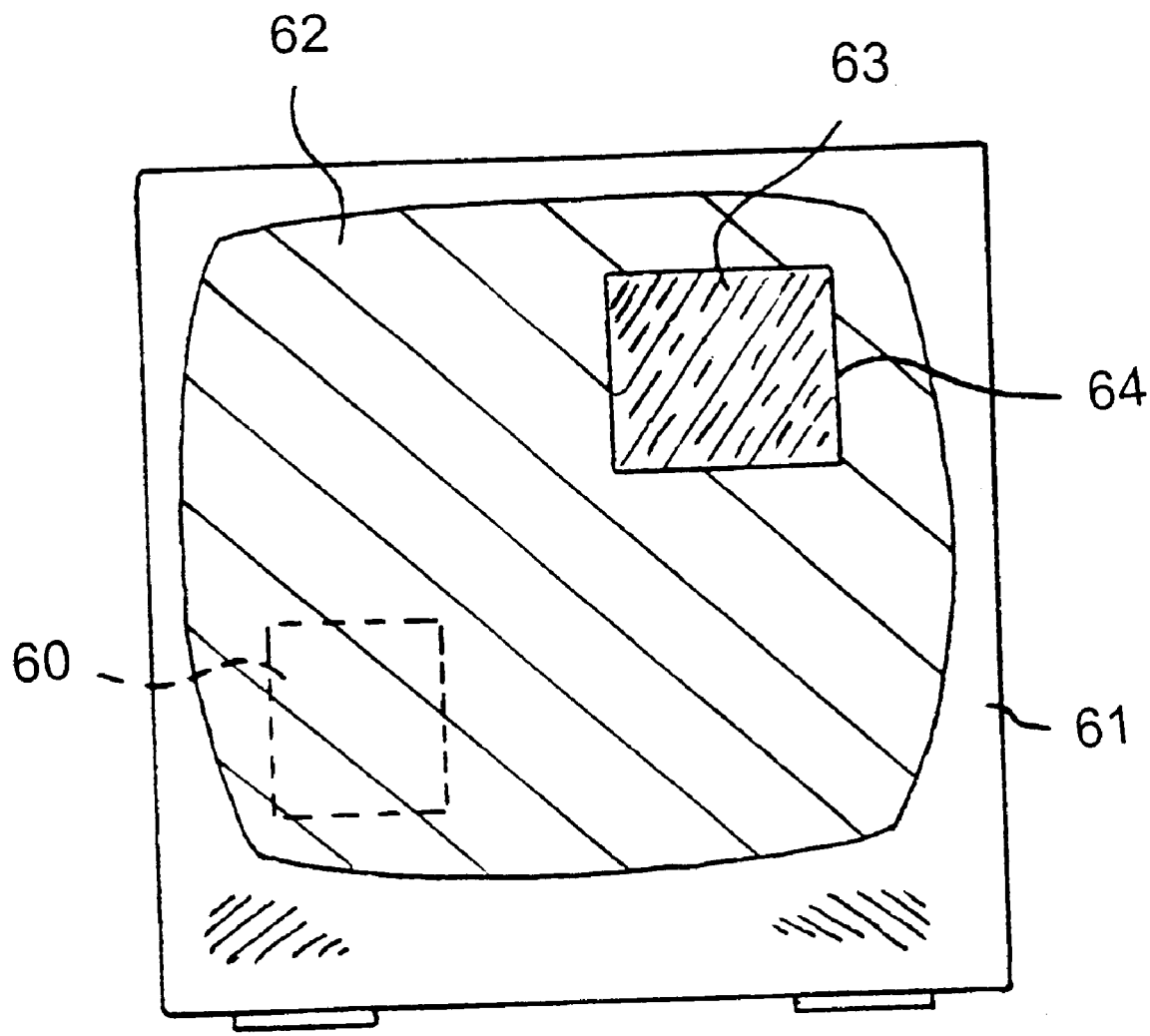
FIG. 6 is a diagrammatic front elevational view of a television set with the novel circuit configuration.

With reference to FIG. 6, there is shown a television set 61 with the above-described circuit configuration 60 indicated in dashed lines. A smaller inset picture 63, bounded by a frame 64, is displayed within a main or parent picture 62.

I claim:

1. A circuit configuration for color coding and decimation for a video signal having a color component, comprising:

an analog-to-digital converter receiving a video signal with a color component, said analog-to-digital converter generating a digitized video signal and having an output;

a recovery device connected to said analog-to-digital converter for recovering from the video signal a carrier coupled to a color subcarrier frequency;

a multiplier connected to said recovery device for multiplicatively combining the carrier recovered in said recovery device with a digitized video signal generated by said analog-to-digital converter, and for thereby generating a first signal component and a second signal component;

a first low-pass filter having an input connected directly to said output of said analog-to-digital converter, said first low-pass filter having a passband below the color component in a frequency spectrum of the video signal, filtering the digitized video signal, and generating a luminance signal component;

a second low-pass filter having an input connected directly to said multiplier, said second low-pass filtering the first signal component and generating therefrom a first chrominance signal component;

a third low-pass filter having an input connected directly to said multiplier, said third low-pass filter filtering the second signal component and generating therefrom a second chrominance signal component;

wherein the luminance signal component and the first and second chrominance signal components output by said first, second and third low-pass filters, respectively, have sampling rates which are reduced relative to sampling rates of their respective input signals, as defined by a degree of decimation.

2. The circuit configuration according to claim 1, wherein a sampling of the video signal in said analog-to-digital converter is coupled to the color subcarrier frequency, and wherein the multiplier includes a first device enabling a sign of the digitized video signal to be altered in a manner coupled to the color subcarrier frequency, and a changeover device enabling an output signal of said first device to be passed to said second or third low-pass filter means with coupling to the color subcarrier frequency.

3. The circuit configuration according to claim 2, wherein said first device is controlled by a signal at twice the color subcarrier frequency and the changeover device is controlled by a signal at four times the color subcarrier frequency.

4. The circuit configuration according to claim 1, wherein the video signal contains a luminance spectral component and a chrominance spectral component modulated on a color subcarrier, and wherein said first low-pass filter has a spectral passband below the chrominance spectral components, and a spectral stop band.

5. The circuit configuration according to claim 4, wherein the video signal contains a picture with a given size which is decimated by a factor $N^2$, and wherein the sampling rate of an output signal of said first low-pass filter amounts to a factor $1/N^2$ of a sampling rate of an input signal of said first low-pass filter.

6. The circuit configuration according to claim 5, wherein the sampling rates for the chrominance signal components amount to a factor 1/M times a sampling rate for the luminance signal component, and wherein respective passbands of said second and third low-pass filters substantially amount to a factor 1/M times the passband of said first low-pass filter means.

7. The circuit configuration according to claim 4, wherein the sampling rates for the chrominance signal components amount to a factor 1/M times a sampling rate for the luminance signal component, and wherein respective passbands of said second and third low-pass filters substantially amount to a factor 1/M times a passband of said first low-pass filter means.

8. The circuit configuration according to claim 1, wherein said first, second, and third low-pass filters each comprise horizontally acting low-pass filters.

9. The circuit configuration according to claim 8, which further comprises vertically acting low-pass filters connected downstream of each of said first, second, and third low-pass filters.

10. The circuit configuration according to claim 9, wherein said vertically acting low-pass filters each have a comb filter characteristic.

11. The circuit configuration according to claim 1, which further comprises vertically acting low-pass filters connected downstream of each of said first, second, and third low-pass filters.

12. The circuit configuration according to claim 11, wherein said vertically acting low-pass filters each have a comb filter characteristic.

13. A television set, comprising: the circuit configuration according to claim 1, a screen displaying a main picture generated by a further video signal, and a second picture, decimated by the circuit configuration and inserted into the main picture.

* * * * *